US007010950B2

(12) United States Patent
Cai et al.

(10) Patent No.: US 7,010,950 B2
(45) Date of Patent: Mar. 14, 2006

(54) SUSPENSION COMPONENT HAVING LOCALIZED MATERIAL STRENGTHENING

(75) Inventors: Haimian Cai, Ann Arbor, MI (US); Hang Li, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 125 days.

(21) Appl. No.: 10/346,580

(22) Filed: Jan. 17, 2003

(65) Prior Publication Data

US 2004/0139780 A1 Jul. 22, 2004

(51) Int. Cl.
*B21J 1/00* (2006.01)

(52) U.S. Cl. ................................ 72/53; 72/58; 72/383; 72/369; 148/570; 219/602

(58) Field of Classification Search ..................... 72/58, 72/383, 369, 53, 60, 458; 148/570; 219/602
See application file for complete search history.

(56) References Cited

U.S. PATENT DOCUMENTS

| | | | | |
|---|---|---|---|---|
| 2,408,190 A | | 9/1946 | Baker | |
| 2,591,339 A | | 4/1952 | Davis | |
| 3,337,200 A | | 8/1967 | Balzer | |
| 3,413,432 A | | 11/1968 | Hörmann | |
| 3,596,037 A | | 7/1971 | Seulin et al. | |
| 4,132,104 A | | 1/1979 | Clavin | |
| 4,526,628 A | * | 7/1985 | Ohno et al. | 148/570 |
| 4,781,054 A | * | 11/1988 | Brown et al. | 72/383 |
| 5,491,996 A | * | 2/1996 | Baarman et al. | 72/369 |
| 5,979,209 A | | 11/1999 | Belliato et al. | |
| 6,233,826 B1 | | 5/2001 | Wycech | |
| 6,384,388 B1 | * | 5/2002 | Anderson et al. | 219/602 |
| 6,418,770 B1 | * | 7/2002 | Binno | 72/58 |
| 6,446,484 B1 | * | 9/2002 | Anderson et al. | 72/458 |

* cited by examiner

*Primary Examiner*—David B. Jones
(74) *Attorney, Agent, or Firm*—Brinks Hofer Gilson & Lione

(57) ABSTRACT

A suspension component for an automobile, such as a stabilizer bar, is provided and includes at least one localized portion having a strengthened outer surface. The localized portion is positioned at a location of highest stress along the suspension component. A method of forming the suspension component is also disclosed.

10 Claims, 4 Drawing Sheets

SUSPENSION COMPONENT HAVING LOCALIZED MATERIAL STRENGTHENING

BACKGROUND OF INVENTION

1. Technical Field of the Invention

The present invention generally relates to a suspension component for an automobile. More specifically, the present invention relates to a stabilizer bar having localized material strengthening, and a method of manufacturing the stabilizer bar.

2. Description of the Prior Art

In an automotive vehicle, suspension components, such as a stabilizer bar, helps to keep the vehicle level, particularly when the vehicle is traveling through a curve. The ends of the stabilizer bar are connected to the right and left wheel assemblies of the vehicle. A pair of brackets, positioned between the ends of the stabilizer bar, secure the stabilizer bar to a structural component of the vehicle. Rubber bushings positioned between the stabilizer bar and the brackets provide limited torsional, axial and radial movement of the stabilizer bar relative to the bracket. The rubber bushings also dampen the movement of the stabilizer bar.

Typically, the goal of the material selection and manufacturing process used to make a stabilizer bar is to form a stabilizer bar with homogenous material properties that meet the highest required yield and fatigue strengths, as determined by calculated finite element analysis procedures. In many cases, cold forming, hot forming, heat treatments, and shot peening operation are performed on the stabilizer bar to achieve the yield and fatigue strength properties. The heat treatments must be applied to the entire stabilizer bar.

In actual use the highest stresses within the stabilizer bar are realized in specific localized areas along the stabilizer bar, not along the entire length. Therefore, stabilizer bars made by more traditional methods, where the entire stabilizer bar is heat treated, present several disadvantages. One disadvantage is that the stabilizer bar is heavier than it needs to be, because the stabilizer bar is homogenous. Another disadvantage is that the process involves unnecessary cost, as the entire stabilizer bar is subjected to heat treatment, when only a localized area must meet the high stress requirements. Finally, the facilities needed to process the stabilizer bar are larger, and require more energy, than needed, because they must be adapted to treat the entire stabilizer bar.

Additionally, typical manufacturing methods for suspension components such as stabilizer bars include heating the bar to a high temperature, bending the bar to the desired shape, and then quenching and tempering the bar. These steps are typically required to maintain the strength of the bar after the bar is bent. Quenching and tempering, however, causes de-carbonization of the entire bar and deformation of the bar, which must be later corrected.

Therefore, there is a need for an improved stabilizer bar, made from a material that can be cold formed to the required shape without requiring heating, quenching and tempering operations, and that includes localized area that are treated to withstand high stresses. Further, there is a need for an improved method of forming a suspension component that allows the suspension component to be cold formed to the required shape and to have localized areas that are treated to withstand high stresses, while the remaining areas of the suspension component are not treated.

A principle object of this invention is to provide a suspension component that is made from a material that can be cold formed to the needed shape and can be cold work hardening strengthened or heat treated to withstand stress levels that will be experienced by the suspension component.

Another object of this invention is to provide a suspension component that has localized portions that are specially treated with cold work hardening, shot peening and/or heat treatment to withstand localized stresses that the suspension component will experience, while the remaining portions of the suspension component remain untreated.

It is also an object of this invention to provide a method of manufacturing a suspension component having localized portions that are work hardening strengthened, shot peened or heat treated to withstand localized stresses that the suspension component will experience, while the remaining portions of the suspension component remain untreated.

SUMMARY OF THE INVENTION

The disadvantages of the prior art are overcome by providing a suspension component, in accordance with the present invention, in which the suspension component includes localized portions that are specially treated using cold work hardening, shot peening and/or heat treatment to withstand localized stresses that the suspension component will experience, while the remaining portions of the suspension component left untreated.

In a first aspect of the present invention the suspension component is formed from one of micro-alloyed boron steel and vanadium steels containing relatively low levels of carbon, such that the suspension component will have good ductility and fracture toughness, to allow the suspension component to be cold formed, and yet still allow the suspension component to be readily heat treated thereafter if heat treatment localized material strengthening is desired.

In another aspect of the present invention the suspension component includes localized portions that are shot peened or heat treated after the suspension component has been cold formed into a desired shape.

In still another aspect of the present invention, the localized portions of the suspension component are induction case hardened.

DETAILED DESCRIPTION OF THE PREFERRED EMBODIMENTS

Figure 1:
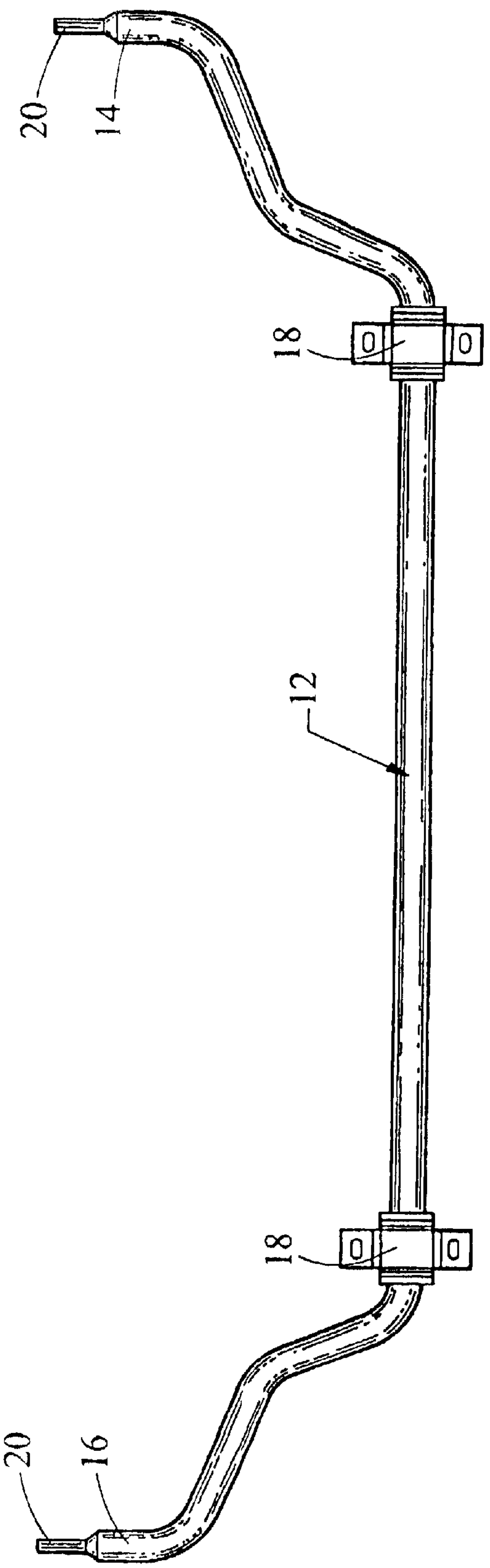
FIG. 1 is a plan view of a stabilizer bar of the present invention.

Referring to FIG. 1, a suspension component for an automotive vehicle is shown generally at 10. The suspension component shown is a stabilizer bar, however, it is to be understood, that the teachings of the present invention are applicable to other suspension components. The stabilizer bar assembly 10 includes a stabilizer bar 12 having opposing first and second distal ends 14, 16. The stabilizer bar 12 is generally made from steel, and can be solid or hollow between the ends 14, 16. The stabilizer bar 12 further includes at least one bushing assembly 18 mounted thereon. The bushing assemblies 18 are adapted to mount the stabilizer bar 12 to the structure of the automobile.

Each of the first and second distal ends 14, 16 have an attachment point 20. The attachment points 20 are adapted to connect the distal ends 14, 16 to wheel assemblies (not shown) on the automobile. The attachment points 20 can be attached to the distal ends 14, 16, by welding. Alternatively, the attachment points 20 can be formed unitary with the distal ends 14, 16, whereby the distal ends 14, 16 are heated, and/or otherwise formed into the shape of the attachment points 20.

In operation, the stabilizer bar 12 is adapted to keep the wheels on opposite sides of the automobile level to one another with respect to the automobile. The shape of the stabilizer bar 12 includes a generally straight center section 22 and two arms 24, 26 extending generally angularly from opposite ends of the straight section 22.

The arms 24, 26 are formed by bending the stabilizer bar 12, such that the arms 24, 26 are integral with the center section 22. The arms 24, 26 extend at and angle to the center section 22. When the distal ends 14 of a first of the two arms 24 is forced upward or downward vertically, the arm 24 acts as a moment arm, thereby transferring torque to the center section 22. The center section 22 transfers the torque to the opposite arms 26, to correspondingly force the second distal end 16 upward or downward.

Figure 2:
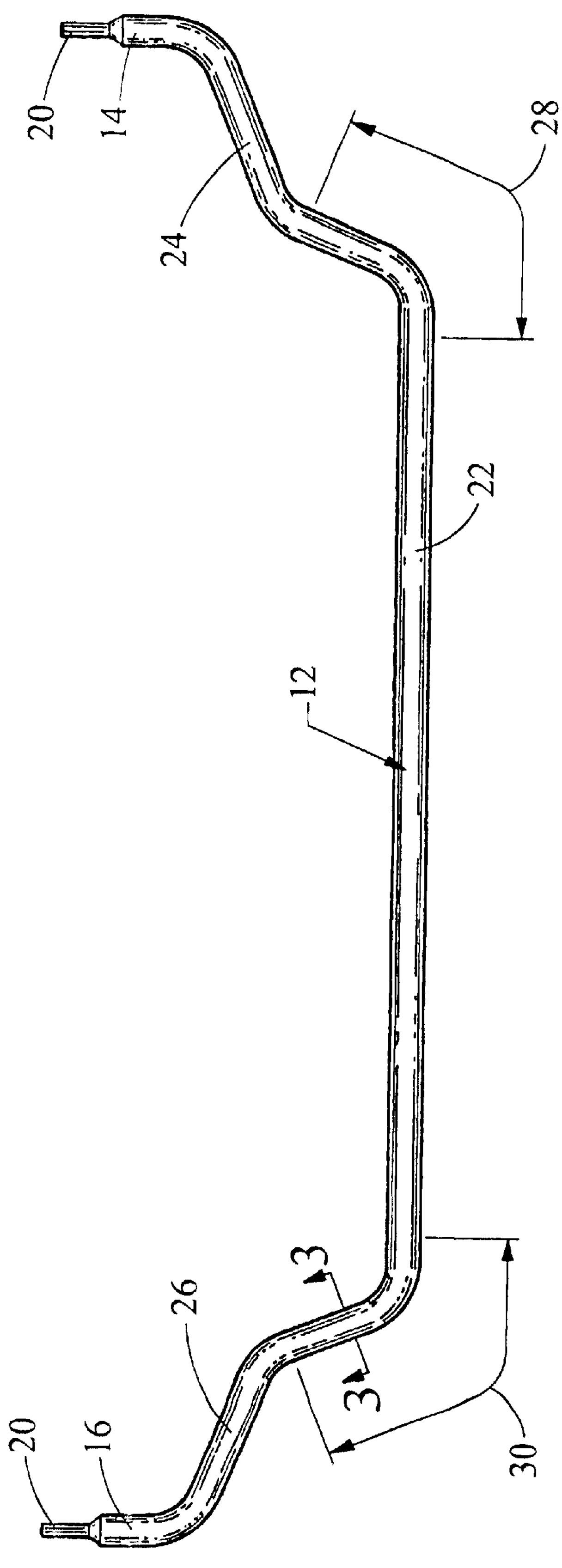
FIG. 2 is a plan view similar to FIG. 1.

Referring to FIG. 2, a finite element analysis identifies localized areas 28, 30 immediately around the bends between the arms 24, 26 and the straight section 22 as the point of highest stress within the stabilizer bar 12 during operation of an automobile. To withstand the higher stresses experienced within the localized areas 28, 30, these localized areas 28, 30 include a strengthened outer surface.

Figure 3:
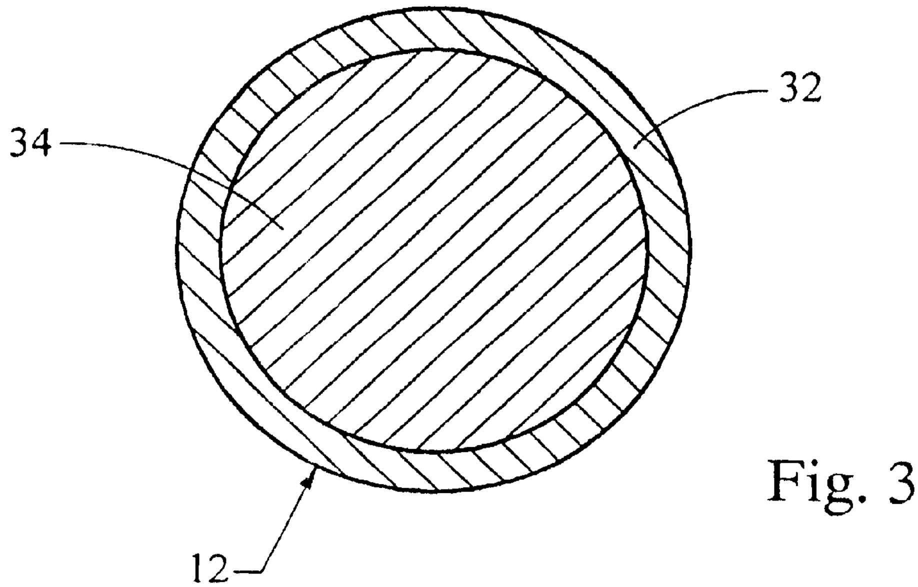
FIG. 3 is a sectional view taken along line 3—3 of FIG. 2, wherein the stabilizer bar is solid.
Figure 4:
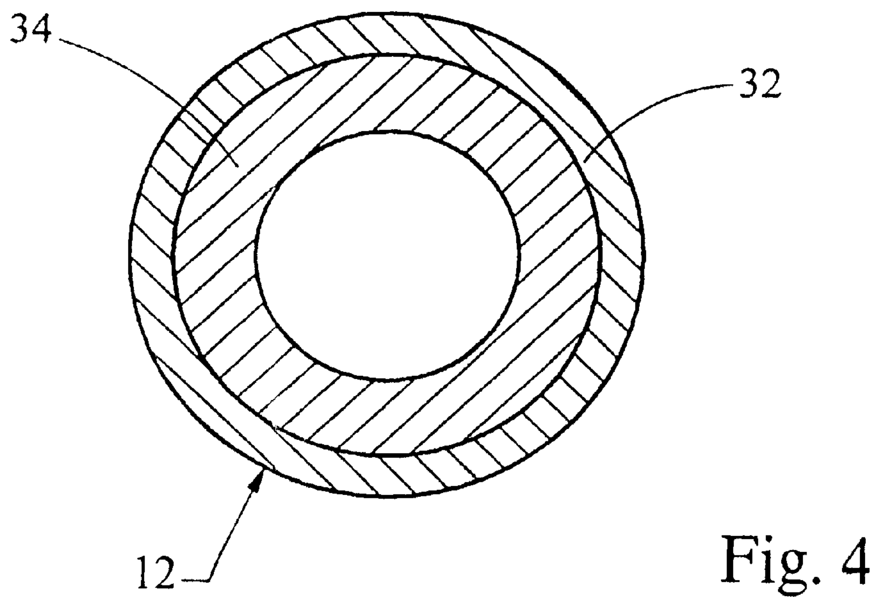
FIG. 4 is a sectional view similar to FIG. 3, wherein the stabilizer bar is hollow.

Referring to FIG. 3, a cross section of a solid stabilizer bar 12 shows an outer surface portion 32 and an inner portion 34. The outer surface portion 32 is strengthened by shot peening the outer surface of the stabilizer bar 12 within the localized areas 28, 30. Alternatively, the surface of the stabilizer bar 12 within the localized areas 28, 30 can be heat treated. The heat treatment used to strengthen the outer surface of the stabilizer bar 12 within the localized areas 28, 30 can be a traditional quench and temper. However, it is typically difficult to perform a quench and temper operation on a localized portion of an object. To resolve this difficulty, the localized areas 28, 30 of the stabilizer bar are preferably induction case hardened, using an eddy current applied to the surface of the stabilizer bar 12 within the localized areas 28, 30. By using an eddy current process to induction case harden the stabilizer bar 12, the area that is treated, and the depth of the treatment can be closely controlled. Alternatively, the stabilizer bar can be hollow, as shown in FIG. 4.

The material of the stabilizer bar 12 is preferably steel, however, the particular steel used is important. Preferably the steel selected has good ductility and fracture toughness and high yield strength. This is necessary to allow the stabilizer bar 12 to be bent to the desired shape. The stabilizer bar 12 is cold worked, meaning the stabilizer bar 12 is bent when it is at ambient temperature, rather than at an elevated temperature.

Further, the steel will be treated to harden the surface within the localized areas 28, 30. Typically, low carbon steels cannot be hardened to the equivalent strength of high carbon steels. With the above in mind, the stabilizer bar 12 of the present invention is preferably formed from a micro-alloyed boron steel, such as 15B21, a vanadium steel, such as 1541V, or other material of similar characteristics. These steels are low carbon steels, but because of the addition of Boron or Vanadium, can be heat treated to hardness and strengths equivalent to high carbon steels. Therefore, the stabilizer bar 12 possesses good ductility and toughness that allows the stabilizer bar 12 to be cold bent to the desired shape, and the localized areas 28, 30 can be heat treated to harness and strength levels that meet the requirements of the application.

Figure 5:
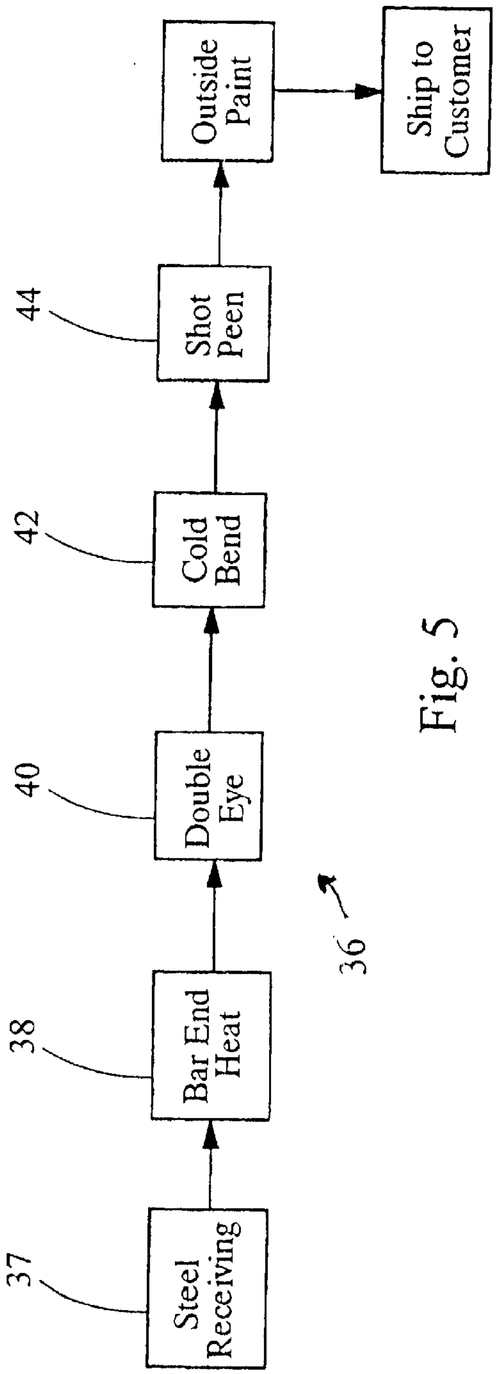
FIG. 5 is a flow chart of a method of manufacturing the stabilizer bar of the present invention, including a shot-peeing process.

Referring to FIG. 5, the localized areas 28, 30 will be localized work hardened during the cold forming process, due to the work hardening material strengthening mechanism. The shaded areas indicate material plastic flow during cold forming, regardless of sold or hollow bars. Material cold plastic flow will induce work hardening effects further localized strengthening the material.

Figure 6:
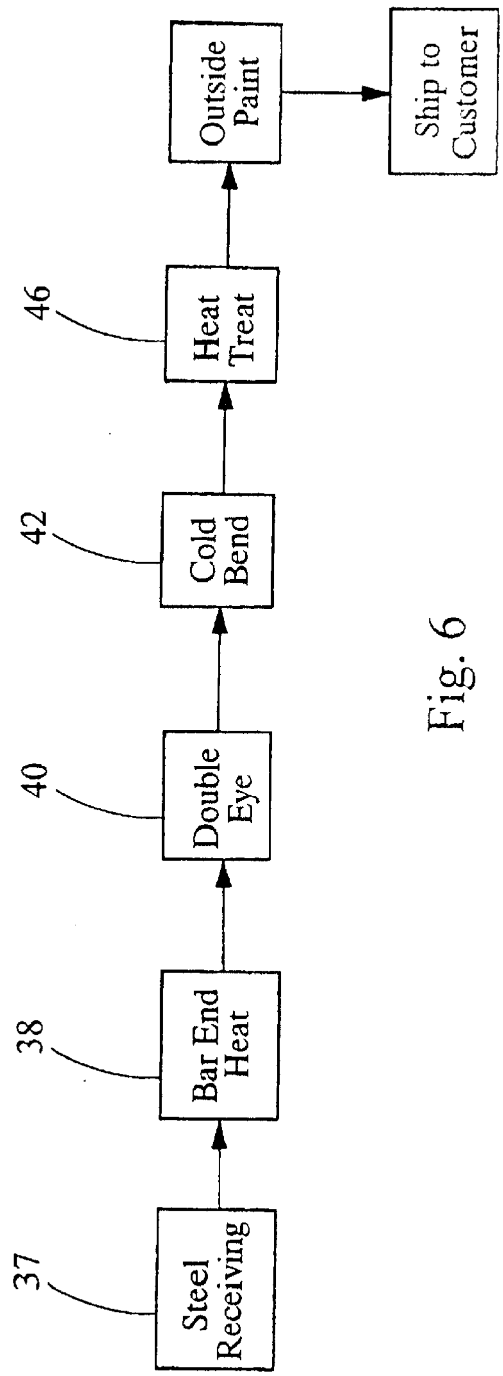
FIG. 6 is a flow chart of a method of manufacturing the stabilizer bar of the present invention, including a heat treating process.

Referring to FIG. 6, a flow chart illustrating method of manufacturing the stabilizer bar 12 according to the present invention is shown generally at 36. After the steel is received, as shown in block 37 of FIG. 6, the attachment points 20 are formed onto the distal ends 14, 16 of the stabilizer bar 12. Preferably, the distal ends 14, 16 are heated, and the attachment points are formed therein by a process known as "Double Eye", as shown in the blocks indicated by reference numerals 38 and 40. Then the stabilizer bar 12 is cold formed into the desired shape as shown in block 42. After the stabilizer bar 12 is cold formed, localized areas of the outer surface are strengthened. In one method, the localized areas of the outer surface of the stabilizer bar 12 are shot peened, to provide compressive forces into the surface of the stabilizer bar 12 which further strengthens the stabilizer bar. This step is illustrated in block 44 of FIG. 6. This step provides the added strength that the localized portions 28, 30 need to withstand the high stresses placed on the stabilizer bar 12 within the localized portions 28, 30. After the shot peening, the stabilizer bar 12 can be painted and shipped.

Referring to FIG. 7, in an alternative process the stabilizer bar 12 is received, as shown in Block 37 of FIG. 6. The attachment points 20 are formed onto the distal ends 14, 16 of the stabilizer bar 12, as shown in blocks 38 and 40, and, and the stabilizer bar 12 is cold formed into the desired shape, as shown in Block 42. However, in the alternative process, after the stabilizer bar 12 is cold formed, the outer surface of the stabilizer bar 12 is heat treated within the localized areas 28, 30, which further strengthens the stabilizer bar 12. This step is illustrated in block 46 of FIG. 7. The heat treatment can consist of a quenching and tempering procedure, an induction case hardening process whereby an eddy current is applied to the surface of the stabilizer bar 12, or other heat treating method. After the heat treatment, the stabilizer bar 12 can be painted and shipped.

The foregoing discussion discloses and describes the preferred embodiments of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. A method of forming a suspension component for an automobile comprising:

providing a substantially straight bar;

forming an attachment device at each opposing distal end of the bar;

cold forming bends within the bar to form the bar to a predetermined shape after the attachment devices have been formed; and treating cold formed bends to provide surface strengthening of the bar within the cold formed bends.

2. The method of claim 1 wherein the bar is formed from steel.

3. The method of claim 1 wherein the bar is formed from one of micro-alloyed boron steel and micro-alloyed vanadium steel.

4. The method of claim 1 wherein forming attachment devices at opposing distal ends of the bar includes heating the distal ends of the bar and forming the distal ends of the bar into attachment devices.

5. The method of claim 1 wherein treating the cold formed bends of the bar to provide surface strengthening of the bar within the cold formed bends includes shot peening the surface of the bar within the cold formed bends.

6. The method of claim 1 wherein treating the cold formed bends of the bar to provide surface strengthening of the bar within the cold formed bends includes heat treating the surface of the bar within the cold formed bends.

7. The method of claim 6 wherein heat treating the surface of the bar within the cold formed bends includes quenching and tempering the bar within the cold formed bends.

8. The method of claim 7 wherein the quenching and tempering of the bar within the cold formed bends is achieved by applying an eddy current to the surface of the bar within the cold formed bends.

9. The method of claim 1 wherein the suspension component is a stabilizer bar.

10. The method of claim 1 further including identifying localized portions of the suspension component that will experience the highest stress loads.

* * * * *